(12) United States Patent
Lamb et al.

(10) Patent No.: US 9,699,431 B2
(45) Date of Patent: Jul. 4, 2017

(54) AUTOMATIC TRACKING, RECORDING, AND TELEPROMPTING DEVICE USING MULTIMEDIA STREAM WITH VIDEO AND DIGITAL SLIDE

(71) Applicant: Satarii, Inc., San Carlos, CA (US)

(72) Inventors: Brian Whitney Lamb, Sunnyvale, CA (US); Vladimir Tetelbaum, Redwood City, CA (US); Eran Steinberg, San Francisco, CA (US)

(73) Assignee: Satarii, Inc., San Carlos, CA (US)

( * ) Notice: Subject to any disclaimer, the term of this patent is extended or adjusted under 35 U.S.C. 154(b) by 529 days.

(21) Appl. No.: 13/971,767

(22) Filed: Aug. 20, 2013

(65) Prior Publication Data

US 2013/0336628 A1 Dec. 19, 2013

Related U.S. Application Data

(63) Continuation-in-part of application No. 13/025,114, filed on Feb. 10, 2011, now abandoned.
(Continued)

(51) Int. Cl.
*H04N 9/79* (2006.01)
*G01S 17/02* (2006.01)
(Continued)

(52) U.S. Cl.
CPC ............... *H04N 9/79* (2013.01); *G01S 5/16* (2013.01); *G01S 17/023* (2013.01); *G01S 17/66* (2013.01);
(Continued)

(58) Field of Classification Search
CPC .......... H04N 9/79; H04N 5/772; H04N 7/155; G01S 5/16; G01S 17/023; G01S 17/66;
(Continued)

(56) References Cited

U.S. PATENT DOCUMENTS 4,980,871 A 12/1990 Sieber et al.
5,179,421 A 1/1993 Parker et al.
(Continued)

FOREIGN PATENT DOCUMENTS

GB 2401752 A 11/2004
WO 8601631 A 3/1986

*Primary Examiner* — Jay Patel
*Assistant Examiner* — Joseph Suh
(74) *Attorney, Agent, or Firm* — Jeffrey Schox; Thomas Gwinn

(57) ABSTRACT

One variation of a method for monitoring an object during a presentation, includes: initiating capture of a video with a camera defining a field of view, the camera arranged on a first side of a mobile computing device supported on a base device; generating a position signal defining a position of the remote device relative to the camera; in response to wirelessly receiving a first input selection from the remote device, indexing through digital slide content rendered on a display arranged on the first side of the mobile computing device; in response wirelessly receiving sensor data from a remote device coupled to the object, generating an event tag including a timestamp; and generating a multimedia stream including the video, the position signal data, digital slide content, the first input selection, and the event tag.

17 Claims, 6 Drawing Sheets

Related U.S. Application Data

(60) Provisional application No. 61/337,843, filed on Feb. 10, 2010, provisional application No. 61/343,421, filed on Apr. 29, 2010, provisional application No. 61/402,521, filed on Aug. 31, 2010, provisional application No. 61/742,846, filed on Aug. 20, 2012.

(51) Int. Cl.

| | | |
|---|---|---|
| *G01S 17/66* | (2006.01) | |
| *G01S 19/48* | (2010.01) | |
| *G01S 5/16* | (2006.01) | |
| *H04N 5/77* | (2006.01) | |
| *H04N 7/15* | (2006.01) | |
| *G09B 5/06* | (2006.01) | |
| *G11B 27/034* | (2006.01) | |
| *G11B 27/10* | (2006.01) | |
| *G11B 27/11* | (2006.01) | |

(52) U.S. Cl.
CPC ............... *G01S 19/48* (2013.01); *G09B 5/06* (2013.01); *G11B 27/034* (2013.01); *G11B 27/105* (2013.01); *G11B 27/11* (2013.01); *H04N 5/772* (2013.01); *H04N 7/155* (2013.01)

(58) Field of Classification Search
CPC ......... G01S 19/48; G09B 5/06; G11B 27/034; G11B 27/105; G11B 27/11
See application file for complete search history.

(56) References Cited

U.S. PATENT DOCUMENTS

| | | | |
|---|---|---|---|
| 5,223,875 A | 6/1993 | Yanagisawa | |
| 5,361,115 A | 11/1994 | Ohtsuka et al. | |
| 5,389,967 A | 2/1995 | Kim | |
| 5,432,597 A | 7/1995 | Parker et al. | |
| 5,668,629 A | 9/1997 | Parker et al. | |
| 5,754,225 A | 5/1998 | Naganuma | |
| 5,995,763 A | 11/1999 | Posa et al. | |
| 6,108,035 A | 8/2000 | Parker et al. | |
| 7,058,891 B2 | 6/2006 | O'Neal et al. | |
| 7,271,827 B2 | 9/2007 | Nister | |
| 8,085,302 B2 | 12/2011 | Zhang et al. | |
| 8,819,564 B1* | 8/2014 | Heath ................ G06F 3/048 235/386 |
| 2002/0013948 A1* | 1/2002 | Aguayo, Jr. ....... H04N 7/17318 725/91 |
| 2002/0059588 A1* | 5/2002 | Huber ................ G07C 9/00158 725/35 |
| 2002/0175994 A1* | 11/2002 | Sakakibara ........... G01B 11/24 348/135 |
| 2003/0096603 A1* | 5/2003 | Chen ................... H04M 1/04 455/416 |
| 2003/0228010 A1* | 12/2003 | Clarisse ............. H04M 1/575 379/207.15 |
| 2004/0116781 A1 | 6/2004 | Weaver | |
| 2005/0073412 A1 | 4/2005 | Johnston et al. | |
| 2005/0159891 A1 | 7/2005 | Cohen et al. | |
| 2006/0059557 A1 | 3/2006 | Markham et al. | |
| 2006/0251382 A1 | 11/2006 | Vronay et al. | |
| 2006/0288280 A1* | 12/2006 | Makela ............... G06F 17/2229 715/205 |
| 2007/0015558 A1 | 1/2007 | Zalewski et al. | |
| 2007/0016426 A1 | 1/2007 | Hershey et al. | |
| 2007/0043533 A1* | 2/2007 | Wiles ................ G01M 13/025 702/183 |
| 2007/0073651 A1* | 3/2007 | Imielinski ......... G06F 17/30386 |
| 2007/0080940 A1* | 4/2007 | Aoki .................. G06F 3/0304 345/158 |
| 2007/0120979 A1 | 5/2007 | Zhang et al. | |
| 2007/0182818 A1 | 8/2007 | Buehler | |
| 2007/0279494 A1 | 12/2007 | Aman et al. | |
| 2008/0001735 A1* | 1/2008 | Tran ..................... G06F 19/3418 340/539.22 |
| 2008/0022325 A1* | 1/2008 | Ober ..................... G06F 1/1616 725/81 |
| 2008/0059578 A1* | 3/2008 | Albertson ............ G06F 3/016 709/204 |
| 2008/0077326 A1 | 3/2008 | Funk et al. | |
| 2008/0095514 A1* | 4/2008 | Yahata ............. G11B 20/10527 386/329 |
| 2008/0136898 A1* | 6/2008 | Eisenberg .............. H04N 7/152 348/14.09 |
| 2008/0165081 A1* | 7/2008 | Lawther ............... G06F 3/1423 345/1.2 |
| 2008/0168178 A1* | 7/2008 | Bouazizi ............ H04N 21/4305 709/231 |
| 2008/0168375 A1* | 7/2008 | Papadimitriou .. G06F 17/30241 715/772 |
| 2008/0195664 A1* | 8/2008 | Maharajh ......... G06F 17/30035 |
| 2008/0276159 A1* | 11/2008 | Narayanaswami ... G06F 17/241 715/202 |
| 2008/0282286 A1 | 11/2008 | Or | |
| 2008/0309774 A1* | 12/2008 | Beng Goh ......... H04N 13/0003 348/218.1 |
| 2009/0080509 A1* | 3/2009 | Itoh ..................... G11B 27/034 375/240.01 |
| 2009/0096632 A1 | 4/2009 | Ullrich et al. | |
| 2009/0121938 A1 | 5/2009 | Wood et al. | |
| 2009/0207250 A1 | 8/2009 | Bennett et al. | |
| 2010/0026470 A1 | 2/2010 | Wilson et al. | |
| 2010/0035688 A1 | 2/2010 | Picunko | |
| 2010/0062812 A1 | 3/2010 | Orr | |
| 2010/0070950 A1 | 3/2010 | Smith et al. | |
| 2010/0085419 A1* | 4/2010 | Goyal .................... H04N 7/147 348/14.09 |
| 2010/0091113 A1* | 4/2010 | Morioka ................ H04N 5/147 348/207.1 |
| 2010/0188581 A1 | 7/2010 | Wirick | |
| 2010/0222179 A1 | 9/2010 | Temple et al. | |
| 2010/0245113 A1* | 9/2010 | Schmehl ................ G08C 17/02 340/539.32 |
| 2010/0283829 A1* | 11/2010 | De Beer ............... H04N 7/152 348/14.09 |
| 2011/0007158 A1 | 1/2011 | Holtz et al. | |
| 2011/0025603 A1* | 2/2011 | Underkoffler ........... G06F 3/017 345/158 |
| 2011/0026008 A1 | 2/2011 | Gammenthaler | |
| 2011/0112996 A1 | 5/2011 | Tu et al. | |
| 2011/0122220 A1* | 5/2011 | Roberts ................. G06Q 10/10 348/14.04 |
| 2011/0169910 A1* | 7/2011 | Khot ....................... H04N 7/15 348/14.09 |
| 2011/0173235 A1 | 7/2011 | Aman et al. | |
| 2011/0205077 A1 | 8/2011 | Cavallaro et al. | |
| 2011/0228098 A1 | 9/2011 | Lamb et al. | |
| 2012/0122592 A1 | 5/2012 | Stafford et al. | |

* cited by examiner

AUTOMATIC TRACKING, RECORDING, AND TELEPROMPTING DEVICE USING MULTIMEDIA STREAM WITH VIDEO AND DIGITAL SLIDE

CROSS-REFERENCE TO RELATED APPLICATIONS

This application is a continuation-in-part application of U.S. patent application Ser. No. 13/025,114, filed on 10 Feb. 2011 which claims priority to U.S. Provisional Application No. 61/337,843, filed on 10 Feb. 2010, U.S. Provisional Application No. 61/343,421, filed on 29 Apr. 2010, and U.S. Provisional Application No. 61/402,521, filed on 31 Aug. 2010.

This application further claims the benefit of U.S. Provisional Application No. 61/742,846, filed on 20 Aug. 2012, which is incorporated in its entirety by this reference.

DESCRIPTION OF THE EMBODIMENTS

The following description of the embodiments of the invention is not intended to limit the invention to these embodiments, but rather to enable any person skilled in the art to make and use this invention.

1. First Method

Figure 1A:
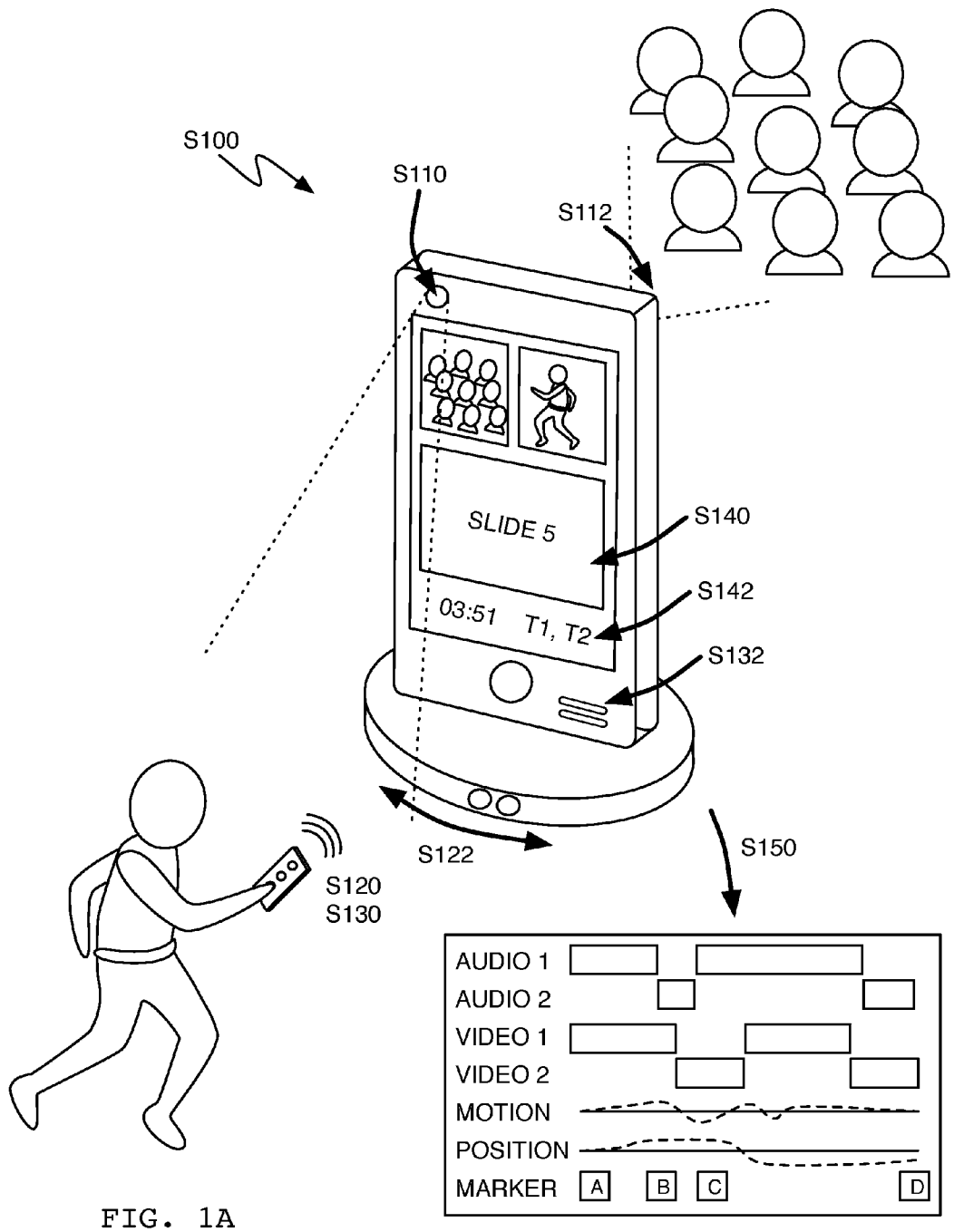
FIG. 1A is a flowchart representation of a first method.

As shown in FIG. 1A, a method for tracking an object during a presentation includes: initiating capture of a video with a camera defining a field of view, the camera arranged on a first side of a mobile computing device supported on a base device in Block S110; wirelessly receiving motion data from a remote device coupled to the object in Block S120; generating a position signal defining a position of the remote device within the field of view of the camera in Block S122; wirelessly receiving an audio signal from the remote device in Block S130; in response to wirelessly receiving a first input selection from the remote device, indexing through digital slide content rendered on a display arranged on the first side of the mobile computing device in Block S140; in response to wirelessly receiving a second input selection from the remote device, generating an event tag including a timestamp in Block S142; and generating a multimedia stream including the video, the motion data, the position signal, the audio signal, digital slide content, the first input selection, and the event tag in Block S150.

Figure 1B:
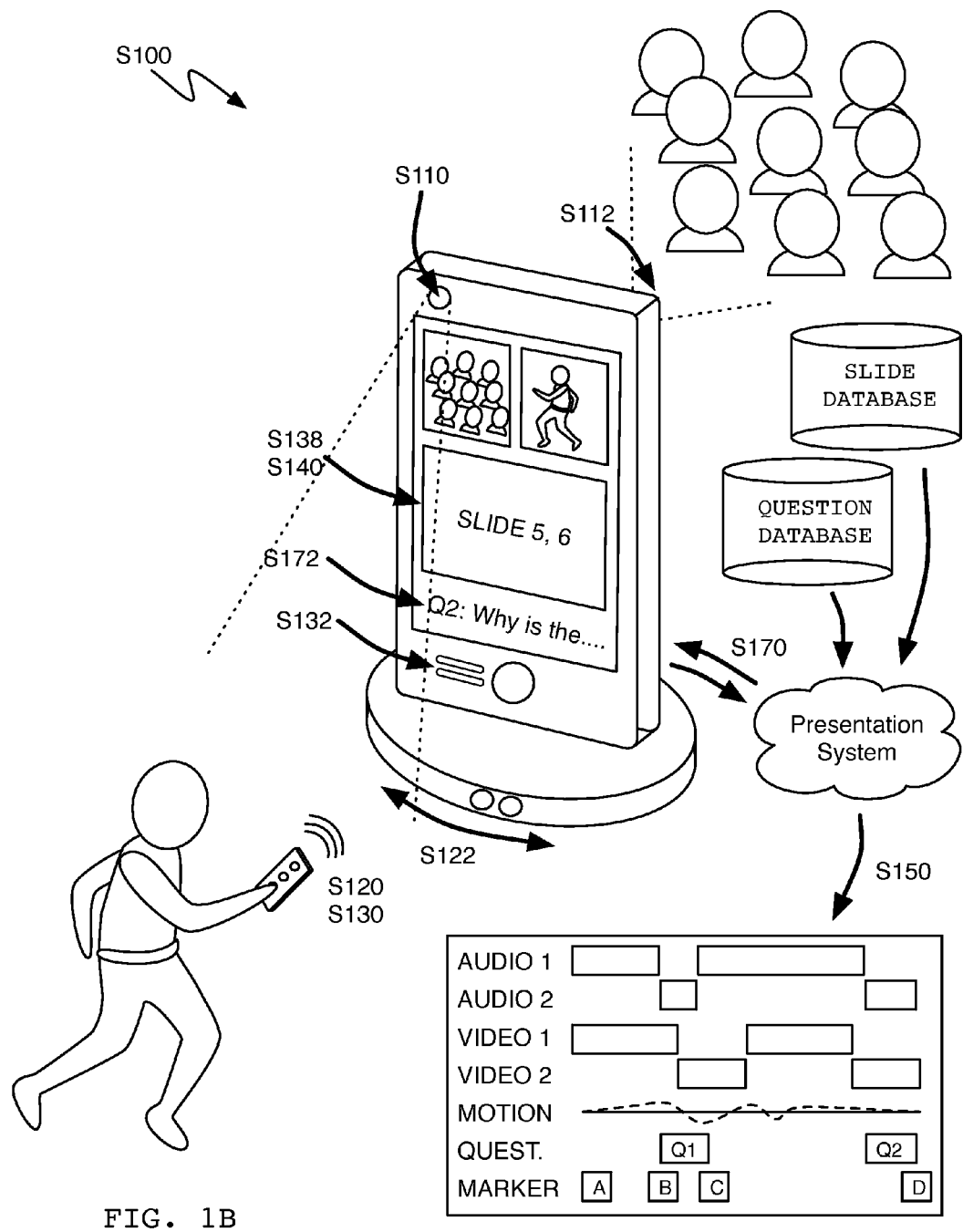
FIG. 1B is a flowchart representation of one variation of the first method.

As shown in FIG. 1B, one variation of the first method S100 includes: initiating capture of a video with a camera defining a field of view, the camera arranged on a first side of a mobile computing device supported on a base device in Block S110; wirelessly receiving motion data from a remote device coupled to the object in Block S120; generating a position signal defining a position of the remote device within the field of view of the camera in Block S122; wirelessly receiving an audio signal from the remote device in Block S130; rendering content of a digital slide deck on a display arranged on the first side of the mobile computing device in Block S138; in response to wirelessly receiving an input selection from the remote device, indexing through content of the digital slide deck rendered on the display in Block S140; downloading an audience question from a computer network in Block S170; displaying the audience question on the display in Block S172; and generating a multimedia stream including the video, the motion data, the position signal, the audio signal, the digital slide deck, the input selection, and the audience question in Block S150.

The first method S100 and variation can also include: initiating capture of a second video with a second camera arranged on a second side of a mobile computing device opposite the first side in Block S112; and recording a second audio signal through the mobile computing device in Block S132; wherein generating the multimedia stream includes generating the multimedia stream that further includes the second video and the second audio signal.

1.1 Applications

Generally, the first method S100 and variation function to amass various audio, video, object motion, user input, and other relevant data streams during a presentation or similar event by interfacing with sensors within a remote device held by or arranged on a user (i.e., the object) and sensors within a mobile computing device supported by an articulating base device. For example, during a presentation, the first method S100 can substantially simultaneously collect videos through fore- and aft-facing cameras within a tablet mounted on a base, audio data through microphones arranged in the tablet, the base device, and/or the remote device, acceleration data from an accelerometer within the remote device, a slide deck pertaining to the presentation, hand sketches created on a touchscreen of the mobile computing device during the presentation, a question from a remote audience member through an Internet connection, and user inputs into the remote device and thus control a servo system within the base device to pan and/or tilt the tablet to track the user during the presentation and store user inputs with timestamps relating the inputs to the videos in time. The first method S100 can subsequently implement the second method S200 described below to combine and splice together the various data into a single multimedia stream, such as substantially in real time as the foregoing data is collected, thereby reducing time and special equipment needed for post-processing of such disparate streams of data into a single viewable audio-visual file.

The first method S100 can therefore be implemented by a teacher during a class period, by a professor during a lecture, by a craftsman during a training session, by an engineer during a product presentation, or any other type of user during any other type of event to capture audio, visual, event, and other data through a common mobile computing device (e.g., a smartphone, a tablet) and a small mobile recording system (e.g., the remote device and the base device described below).

The first method S100 and variation can be implemented as a native A/V (audio/visual) recording application executing on a mobile computing device (e.g., a smartphone, a tablet, a personal data assistant, etc.), wherein the native application interfaces with a base device and a remote device through wired and/or wireless communication channels supported by the mobile computing device when the mobile computing device is installed on (or in) the base device. The native A/V application can collect the foregoing data and pass it to a remote database via a computer network substantially in real time, and the remote database can manipulate the data to generate the multimedia stream (e.g., by implementing the second method S200 described below). For example, the remote database can generate a default multimedia stream, and the native A/V application can enable a user to access the default multimedia stream, manually adjust visual cuts, video segment splices, audio volumes, zoom settings in video frames, etc., and/or set preferences for automated adjustment of the default multimedia stream. Alternatively, the native A/V application can process the foregoing data into a default multimedia stream directly on the mobile computing device, such as in real-time or once the presentation is completed.

The first method S100 can therefore be implemented on or through a recording system including a base device and remote device to track the position of a target object, detect the occurrence of events associated with the tracked object, teleprompt data onto a display of the mobile computing device, and create a hybrid video recording including video of the tracked object (i.e., a user), the presentation data (e.g., slides in a digital slide deck), and local sound data based on user inputs into the remote device and detected events during the presentation.

As shown in FIGS. 1A and 1B, the recording system can include a remote device and a base device. The remote device can be disposed on, held by, or otherwise coupled to an object, such as a user, during a presentation. The remote device can include communication components, such as one or more infrared (IR) emitters, a Wi-Fi transmitter, a Bluetooth module, or other radio frequency (RF) transmitter or transceiver.

1.2 Remote Device

The remote device can include multiple IR emitters disposed over its surface, and the base device can include IR receivers configured to detect IR signals output from the remote device, and the A/V application executing on the mobile computing device can implement Block S122 to track the remote device by interfacing with the IR receivers in the base device. In another example, the A/V application can implement Block S122 by filtering a video output feed from a camera within the mobile computing device to identify IR hotspots within frames of the video feed to track the remote device within a field of view of the camera. Therefore, in this implementation, Block S122 can interface with one or more sensors within the base device or the mobile computing device to detect and track IR signals output from the remote device. In this implementation, the remote device can include multiple transmitters disposed at different locations on the remote device to maintain line of sight IR communication between the remote device and the mobile computing device (and/or base device) substantially regardless of the orientation of the remote device relative to the object and/or the base mobile computing device.

In the foregoing implementation, IR transmitters within the remote device can broadcast periodic short-pulse-duration low-duty-cycle (e.g., 1%) IR signals, such as to extend battery life for the remote device. The IR signals can also be of a wavelength that is not visible to a camera(s) within the mobile computing device such that IR signals do not interfere with the first or second videos. The IR signals can further be of a signal shape and pulse duration that enable an IR receiver in the base device to differentiate broadcast IR signals from ambient IR (e.g., sunlight). In various examples, the remote device broadcasts saw-shaped, ramp-shaped, or square-shaped IR signals. In another example, the remote device broadcasts IR signals according to a pre-defined selected time basis, such as during prescribed time slots set by the base station and transmitted to the remote device over radio frequency (RF) communication.

The remote device can also include an RF transmitter or transceiver, and Block S120, Block S130, and Block S140 (and Block S138) can interface with an RF receiver or transceiver within the base device and/or within the mobile computing device to receive motion, audio, and user input selection data broadcast by the transmitter within the remote device. Alternatively, Blocks of the first method S100 can interface with an IR receiver in the base device or a camera within the mobile computing device to detect audio and/or motion data output from the remote device as IR signals from the IR transmitter.

The remote device also includes a microphone configured to sense local sound (e.g., the voice of the user), and the remote device can transmit a corresponding audio signal to the base device and/or mobile computing device via RF or IR communication protocols, such as Wi-Fi or Bluetooth. Block S130 can thus record this audio signal as the first audio signal.

The remote device further includes an accelerometer configured to output a signal corresponding to motion and/or a change in orientation of the remote device. The remote device can additionally or alternatively include a gyroscope, a GPS sensor, a compass, or any other suitable motion, location, or orientation sensor. Block S120 can collect any of this motion, location, and/or orientation data from the remote device, such as over Bluetooth communication, and then feed this data into Block S122 to track the remote device. Block S120 can additionally or alternatively generate event tags with timestamps based on this data and then feed the event tags into Block S150 to generate the multimedia stream.

In one example of the foregoing implementation, the accelerometer within the remote device includes a three axis accelerometer that outputs multi-dimensional acceleration data, and Block S122 filters the acceleration data (e.g., by applying noise removal filters), integrates the filtered acceleration data, and outputs tracking data indicative of a change in position of the remote device (and therefore the user) following a previous movement measurement, such as by implementing dead reckoning or other suitable technique. In the example, Block S122 can further implement an inertial navigation system (INS) based on linear motion (e.g., accelerometer) data and rotation motion (e.g., gyroscope) data to continuously calculate the position, orientation, and velocity (i.e., direction and speed) of the remote device during video recoding. Block S122 can then implement the position, orientation, and velocity of the remote device to predict a future position of the remote device and generate the position command accordingly. Block S122 can additionally or alternatively implement the position, orientation, and velocity of the remote device to set an acceleration and/or speed of a position change of the base device actuator to efficiently maintain the remote device (and the object, the user) within the field of view of the camera within the mobile computing device. Block S122 can also account for the position of the remote device on the object, such as in a user's hand or attached to the user's head, arm, or torso, when generating the position command. For example, Block S122 can account for an estimated, manually-entered, or default offset distance between the device and the user (e.g., the user's face, the user's torso, etc.) when generating the position command or when calibrating the actuator for a particular user and/or orientation of the remote device relative to the particular user.

The remote device also includes one or more input regions, such as a control button, slider, dial, and/or other type of input region, and Block S130 and S132 can receive input region selections from the remote device, such as in real-time over Wi-Fi or Bluetooth communication protocol.

Blocks S120, S122, S130, S140, S142, etc. can stream motion, tracking, audio, and/or user input data from the remote device substantially in real time. Alternatively, the remote device can include a data store module that stores some or all of the foregoing data for a period of time (during a presentation or demonstration) prior to uploading or 'dumping' the data onto the base device and/or mobile computing device. In this implementation, the remote device can include a processor and a clock to tag the foregoing data with timestamps (e.g., to relate the data to the first video) and filter the foregoing data down to a manageable data size for low-power short-range wireless transmission back to the base device and/or mobile computing device.

The processor within the remote device can also handle different types of input region selections by a user. For example, the processor can receive a signal from an input region on the remote device and respond to the signal by selecting a corresponding input type from a set of available input types and tagging the selected input with a timestamp. The processor can then handle transmission of the input type and timestamp back to the base device and/or mobile computing device, wherein Block S140 responds to the input type accordingly. In this example, Block S150 can also implement the input type and corresponding timestamp to trigger insertion of content (e.g., a static image of a slide from a slide deck) into the multimedia stream. In another example, the processor can similarly correlate an input selection with a marker type from a set of available marker types, assign a timestamp to the marker type, and transmit the marker type and timestamp back to the base device and/or mobile computing device, wherein Block S142 receives the marker type as a time-stamped event. In this example, Block S150 can implement the time-stamped event as a searchable marker within the multimedia stream. In the foregoing examples, the processor can select an input type from a list of instructions or markers including any of: <begin presentation>, <end presentation>, <next page/slide>, <previous page/slide>, <begin timer>, <end timer>, <toggle to secondary camera>, etc.

In one implementation, the processor within the remote device analyses an audio signal output from the internal microphone to extrapolate an action or event from the audio signal and to generate an action or event tag accordingly. For example, the processor can implement pattern matching to match an audio signal snippet to the crack of a baseball on a baseball bat and generate a corresponding "hit" event marker. The processor can then transmit the event tag and timestamp back to the base device and/or mobile computing device, and Block S150 can apply the event tag and timestamp to insert a searchable marker within the multimedia stream and/or set transitions between media (e.g., audio content, visual content) within the multimedia stream. Alternatively, the first method S100 can implement the foregoing functionality on a processor within the base device, mobile computing device, or remote database, etc.

During initialization, the base device and/or the mobile computing device can establish wireless (e.g., RF-based, Bluetooth, Wi-Fi) communication with the remote device(s). For example, the mobile computing device (and/or base device) and the remote device can synchronize or 'sync' by establishing a unique time basis defining specific time slots for prescribed categories of transmitted data between the remote device and the mobile computing device.

1.3 Base Device

The base device functions to support an imager, such as a mobile computing device (e.g., a smartphone, a tablet), and Block S122 controls one or more actuators within the base device to pan, tilt, and/or otherwise manipulate the mobile computing device to maintain the remote device (and therefore the object or user) within a field of view of a camera within the mobile computing device. For example, Block S122 can execute on the mobile computing device while the mobile computing device is installed on the base device, predict a subsequent position of the remote device within the field of view of a forward-facing camera within the mobile computing device, and output a position command through a physical data port connected to an actuator within the base device, and the actuator can apply the position command to move the mobile computing device to a corresponding position. As described above, Block S122 can generate position commands based on motion data from the remote device, the position of an IR transmitter (i.e., IR beacon) within the field of view of the camera, etc.

In one implementation, the actuator includes a servo system that implements a servo position feedback system to apply a position command output in Block S122. For example, the servo system can implement proportional-integral-derivative (PID) closed-loop control and apply a known offset of one or more cameras within the mobile computing device to an output of a position sensor configured to detect an instantaneous servo system position to implement the position command of Block S122. In this example, the position sensor can include optical encoders, variable resistor, or any other suitable type of linear or rotary position sensor. The servo system can include dual-axis servos to position a mobile computing device support to a pan and tilt position defined in the position command.

In one implementation, the base device includes an IR transmitter configured to output an IR signal toward the remote device. In this implementation, the remote device can reflect incident IR back to the base device (or back to the mobile computing device), and Block S122 can handle such reflected IR from the remote device to generate a position signal for the base device to adjust the position of the mobile computing device. For example, the IR receiver within the base device includes 4× quadrant IR photocell. For example, the IR transmitter in the base device can function as a redundant IR system within the recording system, wherein the remote device defaults to IR transmission and the IR transmitter in the base device broadcast IR signals only when IR signals from the remote device are not detected. The IR transmitter in the base device can also transmit IR signals of different shapes, amplitudes, power, etc. to enable differentiation between IR signals originating from the remote device and the base device.

The base device can additionally or alternatively include a quad-cell IR photocell sensor including quadrants labeled A, B, C, D, each including a photosensor. Block S122 can thus interface with the quad cell IR sensor to compute an azimuth (i.e., offset between the orientation of the camera and the remote device in the horizontal axis), elevation (i.e., offset between the orientation of the camera and the remote device in the vertical axis), and/or magnitude (i.e., overall strength) of the IR signals generated and/or reflected by the remote device. In particular, Block S122 can implement outputs of the quad cell IR sensor to determine how much IR energy is detected in each of the four cells, calculate the position of the remote device relative to each cell, and generate the position command accordingly.

In this implementation, the IR transmitter and corresponding IR receiver within the based device can be motively decoupled from the support for the mobile computing device such that the mobile computing device can be positioned (e.g., panned, rotated, tilted) away from the remote device while the IR transmitter and corresponding IR receiver continue to transmit and receive reflected IR signals from the remote device. For example, Block S122 can output a command signal to the servo system within the base device to pan the mobile computing device to capture video of an audience in front of the user (i.e., presenter) while continuing to track the user who is now outside of the field of view of the camera within the mobile computing device.

Block S122 can also apply cinematic rules in generating a position command. In one example, Block S122 can withhold transmitting a position command to move the actuator within the base device until the remote device (and/or the object, the user) moves outside of prescribed distance from the center of the field of view of the forward-facing camera. In another example, Block S122 receives remote device acceleration data from Block S120 and sets of speed of motion of the actuator accordingly. In this example, if Block S122 determines that acceleration data from the remote device indicates movement of the object but an IR signal from the remote device is lost, Block S122 can default to generating position commands based on remote device acceleration data rather than IR signal data. Furthermore, in this example, if Block S122 determines that motion data received from the remote device indicates acceleration of the object but received IR signals indicate that the remote device has not moved, Block S122 can zoom the forward-facing camera out and hold the actuator within the base device in a fixed position, such as to avoid repetitive, opposing motions of the mobile computing device until the remote object displaces a distance greater than a threshold distance across the field of view of the first camera. Block S122 can apply similar functionality and methods to generate position commands to track an object, individual, and/or remote device, etc. in a field of view of the rear-facing camera within the mobile computing device.

The base device can also include one or more microphones, and Block S132 can record a mono or stereo second audio signal from the one or more microphones within the base device. In one example, the base device includes a pair of microphones coupled to the mobile computing device support, facing outward from a forward-facing camera side of the support, and spaced apart by 120°, and Block S132 can record a stereo audio file with outputs from the pair of microphones. In another example, the base device includes a pair of microphones coupled to the mobile computing device support with a first microphone pointing outward from the base device in line with a forward-facing camera of the mobile computing device and a second microphone in line with a rear-facing camera of the mobile computing device, and Block S132 can record and tag an output signal from the first microphone as coming from the direction of the user (or presenter) and record and tag an output signal from the second microphone as coming from the direction of the audience. In the foregoing examples, Block S132 can receive the second audio signal(s) from the microphone(s) over a wireless connection with the base device (e.g., via a Bluetooth connection) or over a wired connection, such as over a physical data port in the mobile computing device. Alternatively, Block S132 can record the second audio signal through one or more microphones within the mobile computing device. Block S132 can also fuse multiple audio signals from the microphones within the base device and/or within the mobile computing device to generate a three-dimensional map or soundscape proximal the base device and pass elements of the three-dimensional map to Block S122 to drive generation of position commands for the base device.

The base device can further include a processor configured to implement various Blocks of the first method S100, such as Block S122 to track the remote device and generate a position command accordingly or Block S142 to receive an input selection from the remote device and generate an event tag and timestamp accordingly.

One variation of the recording system includes multiple remote devices such that Blocks S120, S130, etc. can collect data from the multiple remote devices and Block S122 can track the multiple remote devices simultaneously or sequentially. In this variation, each remote device can be assigned a unique identifier code, such as a unique Bluetooth identifier, and Blocks of the first method S100 distinguish between the multiple remote devices based on the unique identifiers. For example, once the base device establishes a wireless connection with two or more remote devices, the base device can assign a specific non-overlapping time slot for data transfer for each of the identified remote devices. In the example described above, the quad cell IR sensor can distinguish the remote devices based on different IR signal amplitudes, shapes, and/or power levels, etc. or by selecting time bases for IR signal broadcasting from the remote devices.

Alternatively, the processor within the base device can toggle IR and/or RF transmission from one or more remote devices, such as by wirelessly transitioning select remote devices to an 'off', 'sleep', or 'standby' mode by transmitting a corresponding command via RF-based communication to the select remote devices. Blocks S120, S130, S140, S142, etc. can thus receive independent motion, audio, input region selections, etc. from the various remote devices substantially simultaneously or in series.

In the foregoing variation, Block S142 can receive an input selection from a particular remote device to trigger Block S122 to track the particular remote device. In this implementation, a subsequent input selection received in Block S142 from a second remote device can trigger Block S122 to switch to tracking the second remote device. Alternatively, Block S120 can extract a gesture from motion data received from a particular remote device, correlate the gesture with a tracking command, and trigger Block S122 to track the particular remote device accordingly.

Yet alternatively, Block S130 can extract a voice activation command from an audio signal received from a particular remote device to trigger Block S122 to track the particular remote device. Similarly, Block S130 can implement an envelope detector (i.e., amplitude peak detector) to identify local sound exceeding a threshold level and trigger Block S122 to track the corresponding remote device accordingly. For example, when Block S130 detects a first user speaking into a first remote device, Block S122 controls the base device to track the first remote device. In this example, Block S122 continues to track the first remote device even after the first user stops speaking. When a second user then speaks into a second remote device, Block S122 then transitions to tracking the second remote device. Blocks S122 and S130 can thus cooperate to toggle between tracking various remote devices based on audio levels into the remote devices, wherein Block S130 triggers Block S122 to selectively track different remote devices based on sound levels detected proximal the remote devices. Alternatively, Block S130 can trigger the mobile computing device to toggle between Block S110 and Block S112 to record video through opposing cameras within the mobile computing device. Block S130 can also generate sound-based event tags with timestamps and pass these tags to Block S150 to assemble splices of video and audio data into the multimedia stream. The method can also control one or more cameras within the base device to capture the first video, the second video, or a third video during the presentation.

Blocks of the first method S100 implemented on the base device and/or mobile computing device can alternatively recognize remote devices assigned different roles and handle data from and tracking of each according to assigned roles of each. In one example, the recording system includes a target remote device that is tracked through Block S122 and a director remote device that outputs input regions selections prioritized in Blocks S140 and S142. In another example, the recording system includes a primary remote device and an audience remote device, wherein the primary remote device is assigned to a lecturer, presenter, etc. and defines a primary tracking target, and wherein the audience remote device is assigned to one or more audience members to log questions or other events during the presentation. In this example, Block S122 can switch from tracking the primary remote device to the audience remote device based on an input selection received from the primary remote device in Block S142, audio thresholds of audio signals received from the primary device and the audience device(s) in Block S130, etc., and Block S122 can swivel the base device to track the audience remote device with the forward-facing camera or switch to the rear-facing camera within the mobile computing device to capture the audience remote device in video.

However, Block S122 can function in any other way to generate a position command to control one or more actuators within the base device to reposition the mobile computing device to maintain the remote device—and therefore a user—in a field of view of a camera within the mobile computing device.

1.5 Mobile Computing Device

Recording audio, video, and data feeds through the recording system, such as during a presentation or a demonstration, can be initiated by selection of one or more input regions on the remote device, an input region on the base device, and/or a virtual input region rendered on a display of the mobile computing device. Once recording begins, Block S110 can begin capture of the first video through a first camera within the mobile computing device while Block S122 tracks the remote device. Block S112 can substantially simultaneously record the second video through a second camera within the mobile computing device. Alternatively, the Blocks of the first method S100 can toggle between recording video through the first camera in Block S110, recording video through the second camera in Block S112, and/or recording video through a camera within the base device or the remote device. Blocks S130 and S132 can similarly record audio feeds from the remote device and locally (e.g., through a microphone on the mobile computing device or within the base device), respectively, such as simultaneously or sequentially.

Blocks S110 and S112 and Blocks S130 and S132 can additionally or alternatively trigger video capture and audio capture, respectively, based on objects recognized in one or more video streams, such as a whiteboard, a face, or a projector screen.

As described above, the mobile computing device can include a forward-facing (i.e., first) camera on a first side of the mobile computing device, a rear-facing (i.e., second) camera on a second side of the mobile computing device opposite the first side, a display or a touchscreen on the first side of the mobile computing device adjacent the first camera, and a wireless communication module and/or a data port to communicate data to and/or from the base device and/or the remote device(s). The mobile computing device can also be Internet-capable, such as to upload the multimedia stream and associated audio, video, and/or event tag data to a remote database. For example, the mobile computing device can include a smartphone or a tablet, as described above.

Therefore, Block S110 and S112 can define opposing fields of view such that different areas of the presentation space can be captured visually during the presentation. For example, the mobile computing device can be installed on the base device near the center of an auditorium with the forward-facing camera and adjacent display facing a lecturer (the user), and Block S110 can record the first video that is of the lecturer, and Block S112 can record the second video that is of the audience.

Blocks S110 and S112 can record the first and second videos in digital format and store the first and second videos locally until completion of the recording session. Once the session is complete, Block S150 can process the first and second videos with additional audio and other data to generate the multimedia device or upload the videos to a remote database for processing. Additionally or alternatively, Block S110 and S112 can upload the first and second videos to the remote database substantially in real-time, such as for video backup or for processing to generate the multimedia stream substantially in real-time.

Blocks S110 and S112 can further cooperate with other Blocks of the first method S100, such as Block S122, to detect a distance between the first camera and the object and a distance between the second camera and a second target (e.g., an audience or an audience member) and to automatically focus the first and second cameras accordingly substantially in real time.

1.6 Tracking

Block S122 of the first method S100 recites generating a position signal defining a position of the remote device within the field of view of the camera in Block S122. In one implementation, Block S122 outputs the position signal to an actuator within the base device to adjust an orientation of the mobile computing device based on a position of the remote device within the field of view of the first camera. Block S122 can therefore function to control an actuator within the base device to maintain the remote device—and therefore at least a portion of the user—within the field of view of the first camera throughout the first video, as described above. For example, Block S122 can output a position control specifying a pan position of a servo system within the base device.

Block S122 can execute on the mobile computing device and implements object recognition, such as face detection, to detect the object, user, and/or remote device within the field of view of the first camera. Once Block S122 identifies the object, user, and/or remote device, Block S122 can further output a position signal to the base device to set a new orientation of the mobile computing device. For example, Block S122 can track the object, etc. in sequential frames of the first video to track object movement and generate position signals accordingly.

In the foregoing implementation, Block S122 can generate the position signal to maintain a portion of the object at a substantially constant position within the field of view of the first camera. For example, Block S122 can implement facial detection to detect the user's face and then generate the position signal to maintain the user's face within the center of the field of view of the first camera. Alternatively, Block S122 can track IR signals broadcast from the remote device, assign a static offset distance between the remote device and the user's face, and generate the position signal based on the IR signals from the remote device and the static offset to maintain the user's face at a centered location (e.g., X1,Y1) in the field of view of the first camera.

Block S122 can also implement any of the foregoing IR tracking, motion data analysis, or other tracking techniques described above independently and/or in combination with object recognition/detection to generate position signals to track the object, user, and/or remote device.

Block S122 can therefore implement sensor fusion to combine disparate data to track the object and adjust the orientation of the mobile computing device accordingly. For example, Block S122 can apply a Kalman filter to various tracking-related data to fuse noisy input data from various sensors (e.g., an accelerometer, a microphone, an input region, video-based object recognition, etc.) into an estimate of the instantaneous position of the object. In this example, Block S122 can then fuse the instantaneous position of the object with a current position of the mobile computing device support of the base device to generate the position command.

The position signal generated in Block S122 can include a qualitative target position for the actuator within the base device, such as an arcuate pan degree position (e.g., 17.2°) and/or an arcuate tilt position (e.g., 5.8°), and a controller within the base device can implement closed loop feedback to hit the target position(s) based on the position signal. Alternatively, the position signal can include a digital (i.e., low-current) binary control signal to turn a pan and/or tilt actuator 'ON' or 'OFF', and Block S122 can receive a pan or tilt position from associated sensors within the base device to implement closed-loop feedback to hit a target pan/tilt position. Yet alternatively, Block S122 can extract a position of the remote device (or object) within the field of view of the first (or second) camera relative to a fixed point within the field of view (e.g., a top-right corner of the field of view) and implement closed-loop feedback to control the base device actuator based on the extracted position.

Block S122 can also generate position tags and corresponding timestamps for various detected or estimated positions of the object. Position tags can be stored locally and/or on a remote database for real-time or asynchronous generation of the multimedia stream in Block S150, as described below.

1.7 Presentation Controls

Block S140 of the first method S100 recites, in response to wirelessly receiving a first input selection from the remote device, indexing through digital slide content rendered on a display arranged on the first side of the mobile computing device.

In one implementation, the first method S100 downloads a slide deck into the native A/V application executing on the mobile computing device, as shown in FIG. 1B. For example, the first method S100 can download the slide deck from a cloud-based data storage server or from a physical data card inserted into a data card port within the mobile computing device. Once recordation of the video, audio, and other data streams is initiated as described above, Block S140 can display a first slide of the slide deck on the forward-facing display (e.g., touchscreen) of the mobile computing device and then index through subsequent slides based on an input region selection received from the remote device, as shown in FIG. 2B. For example, as described above, Block S140 can receive <begin presentation>, <end presentation>, <next slide>, and/or <previous slide> selections from the remote device and respond accordingly by updating content displayed on the display of the mobile computing device. Alternatively, Block S140 can display slide notes corresponding to a current slide selection rather than the current slide, or Block S140 can display slide notes simultaneously with the current slide.

In the foregoing implementation, Block S140 can thus function to implement a teleprompter for the user during a presentation by displaying slides and/or slide notes. Because the forward-facing camera and the display within the mobile computing device may be fixed relative to one another and because Block S122 controls the base device to point the forward-facing camera toward the remote device (and therefore the user), Block S122 can also function to maintain the display in a viewable position for the user even as the user moves (e.g., paces, advances toward the audience, etc.) during the presentation.

Figure 2A:
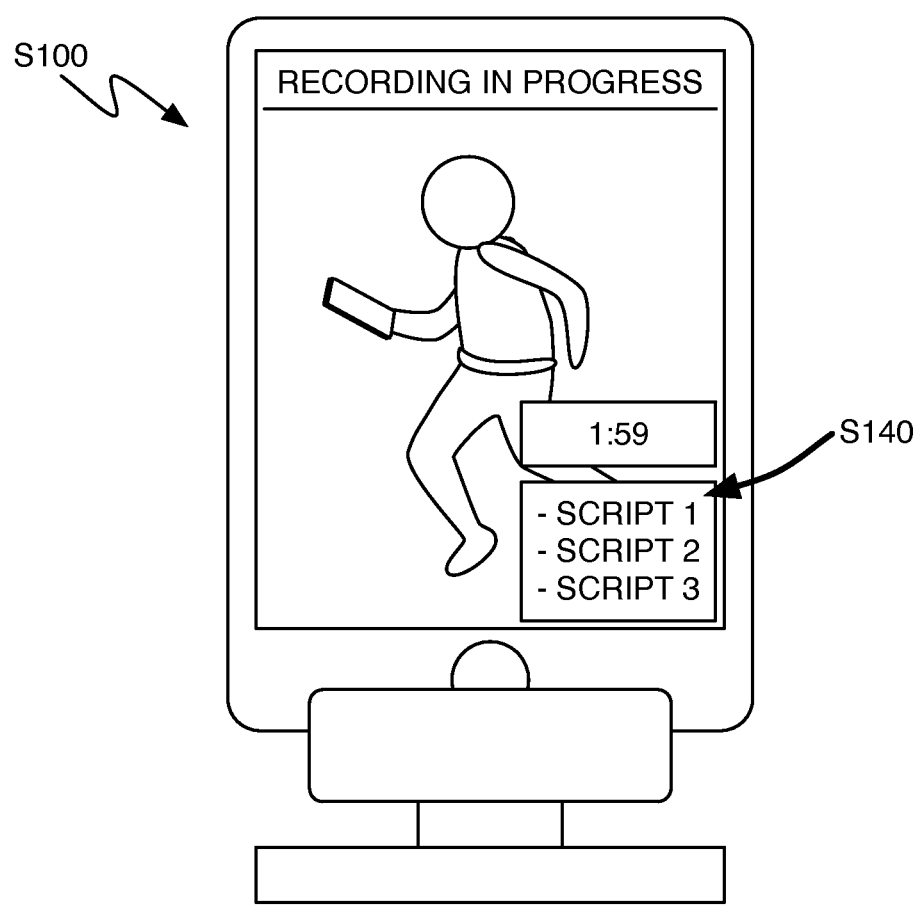
FIG. 2A is a schematic representation in accordance with one variation of the first method.
Figure 2B:
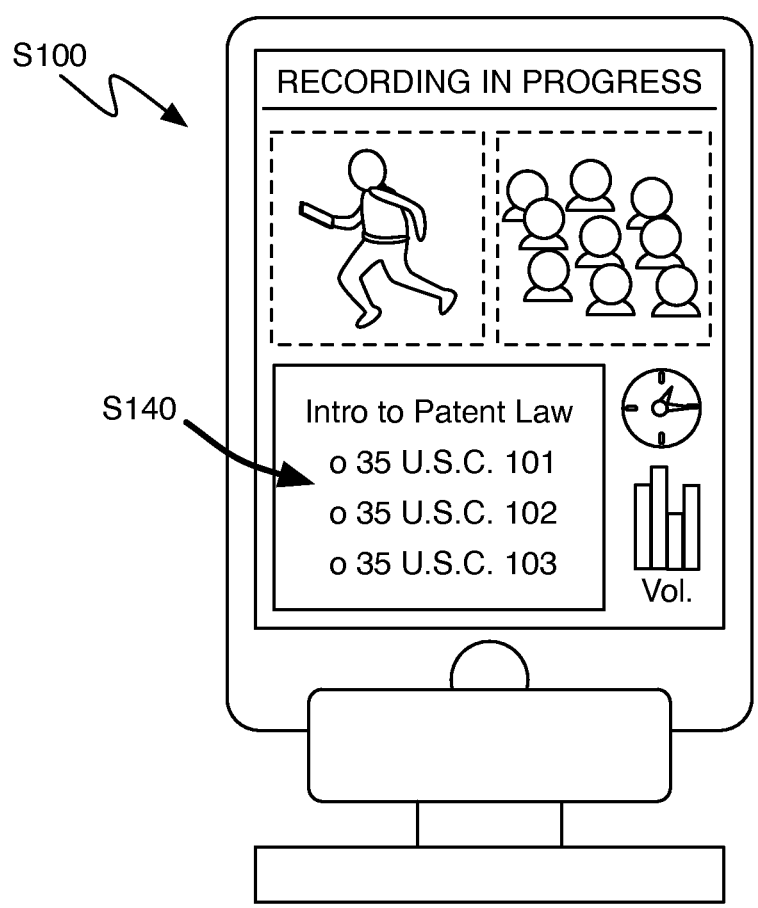
FIG. 2B is a schematic representation in accordance with one variation of the first method.

Block S140 can also render a script, presentation or recording system instruction, a date, a timer or a clock, (live) frames from the first video, (live) frames from the second video, a graphic of the audio levels of the first and/or second audio signals, a copyright notice, subtitles, location (e.g., GPS) data, image size in the first and/or second video feeds, audio and/or video compression, image and/or audio quality, a number of frames recorded per second, an audio bandwidth and/or compression, color depth, etc. on the display to support the user through the presentation and recordation thereof, as shown in FIG. 2A. Block S140 can also toggle any of the foregoing data during the presentation based on an input selection received from the remote device or an input received directly through the mobile computing device, such as through the touch screen.

In the foregoing implementation, Block S140 can store received input selections corresponding to slide controls as slide tags including slides numbers (or other slide identifiers) and corresponding timestamps, which can be fed into Block S150 to control insertion of slides into the multimedia feed. Alternatively, Block S140 can generate slide tags that include whole slides, URLs to unique slides, links to independent slide files, or any other slide-related data.

Block S140 can also control wired or wireless transmission of a current slide (or slide animation, etc.) to a projector, screen, or other display within the presentation space for presentation to the audience. For example, the slide deck can be stored on the mobile computing device, and Block S140 can transmit a current slide via Bluetooth or WiFi to a wireless-enabled projector non-transiently installed in the presentation space. Block S140 can similarly transmit the current slide to a computing device (e.g., a laptop) connected to a static or mobile projector within the presentation space. Alternatively, the slide deck can be stored on a computing device connected to the projector (or on the projector itself), and Block S140 can handle transmission of slide change commands from the remote device to the computing device to control slide changes at the projector. For example, Block S140 can wirelessly broadcast a slide change command in response to receiving the first input selection from the remote device and then store the first input selection as a slide number and associated timestamp relative to the first video.

The native A/V application, the first method S100, and Block S140 can similarly handle other content, such as static images, videos, audio files, sketches produced by the user during the presentation, etc., for presentation to an audience, and Block S140 can generate corresponding content tags for implementation in Block S150 to insert such content into the multimedia stream.

As shown in FIG. 1B, one variation of the first method S100 includes Block S170, which recites downloading an audience question from a computer network, and Block S172, which recites displaying the audience question on the display, can implement functionality similar to that of Block S140 to render presentation-related content on the display of the mobile computing device during the presentation. Generally, Blocks S170 and S172 function to collect a question from a local or remote audience member and render the question on the display of the mobile computing device for the user.

In one implementation, Block S170 downloads a question from a computer network via an Internet connection. In this implementation, a member within the audience and/or viewing the multimedia stream substantially in real time from a remotely-located computing device (e.g., on a computer in the audience member's home) can submit a text-based question to the computer network, such as through a web browser, a native multimedia stream viewing application executing on a computing device, or a presentation question submission application executing on a computing device. The web browser or native application can assign a target specifying the current presentation, and Block S170 can download the question based on the assigned target. Alternatively, Block S170 can sync within one or more computing devices within the audience, such as over Bluetooth, and download questions directly from the audience members through the synced computing devices. However, Block S170 can download one or more text-based questions from one or more local or remote audience members via any suitable computing device and Internet, wireless, or other connection. Block S170 can also download drawings, sketches, Internet links (i.e., URLs), or other content related to a question onto the mobile computing device and/or recording system.

Figure 2C:
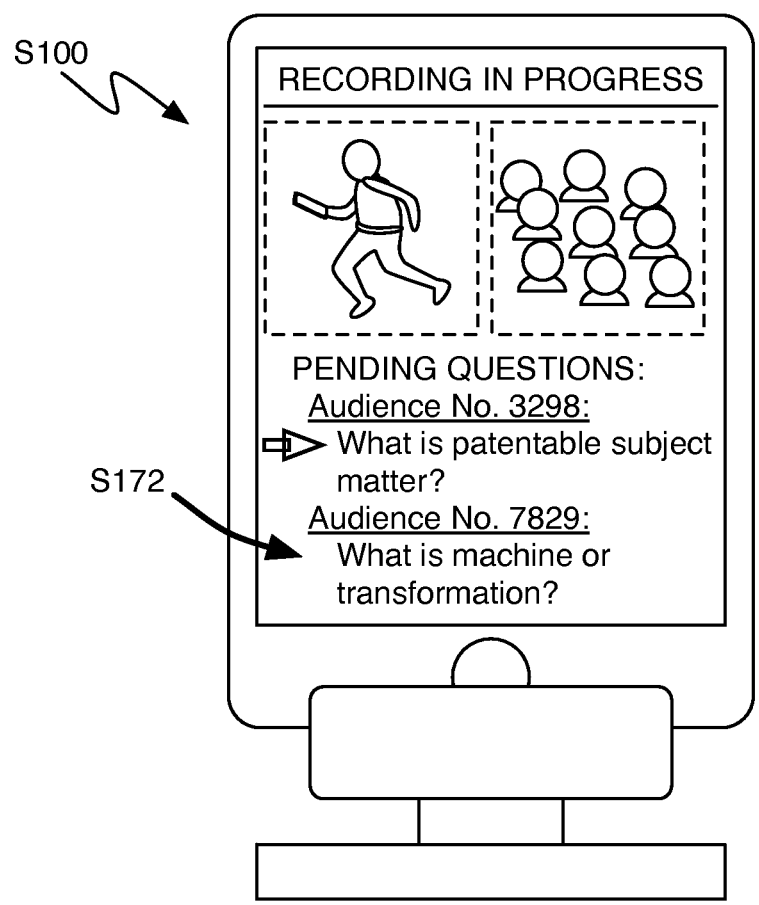
FIG. 2C is a schematic representation in accordance with one variation of the first method.

Block S170 can download a text-based question during a presentation portion of the recording (i.e., when the user is speaking), and Block S172 can render question on the display soon thereafter, such as to notify the user of confusion or need for clarification within the audience substantially in real-time, as shown in FIG. 2C. Block S172 can also receive an input selection from the remote device to ignore and remove the question from the display, store and delay the question (e.g., by a default period of time), project the question for the audience, etc. and respond to the input selection accordingly. Block S172 can additionally or alternatively display the audience member question at the end of the presentation, such as once the user submits an input selection on the remote device to trigger a question and answer (Q/A) session.

Block S170 and Block S172 can also cooperate to generate a question tag including the question, additional question-related content submitted by an audience member, a timestamp of when the question was submitted, and/or a timestamp of when the user responded to the question (e.g., based on a user input selection through the mobile computing device), etc. However, Blocks S170 and S172 can retrieve, store, tag, and render on the display, etc. any one or more questions of any suitable format or content from a local or remote audience member over any other local, Internet, or other network connection.

1.8 Multimedia Stream

Block S150 of the first method S100 recites generating a multimedia stream including the video, the motion data, the position signal, the audio signal, digital slide content, the first input selection, and the event tag. Block S150 can also generate the multimedia stream that further includes any one or more of the second video, the second audio signal, and the audience question.

Generally, Block S150 implements Blocks of the second method S200 to generate a stream of audio, video, and event tags from any combination of the foregoing data, such as described below. For example, Block S150 can initiate a multimedia stream in response to initiation of the first video, insert a segment of the first video and a corresponding segment of the first audio signal into the multimedia stream; insert a portion of the second video into the multimedia stream based on an increased sound level in the second audio signal during a time period corresponding to the portion of the second video, inserting a slide from the digital slide deck into the multimedia stream for a preset amount of time based on a timestamp of the first input selection, and insert a searchable marker into the multimedia stream based on the event tag.

2. Second Method

Figure 3:
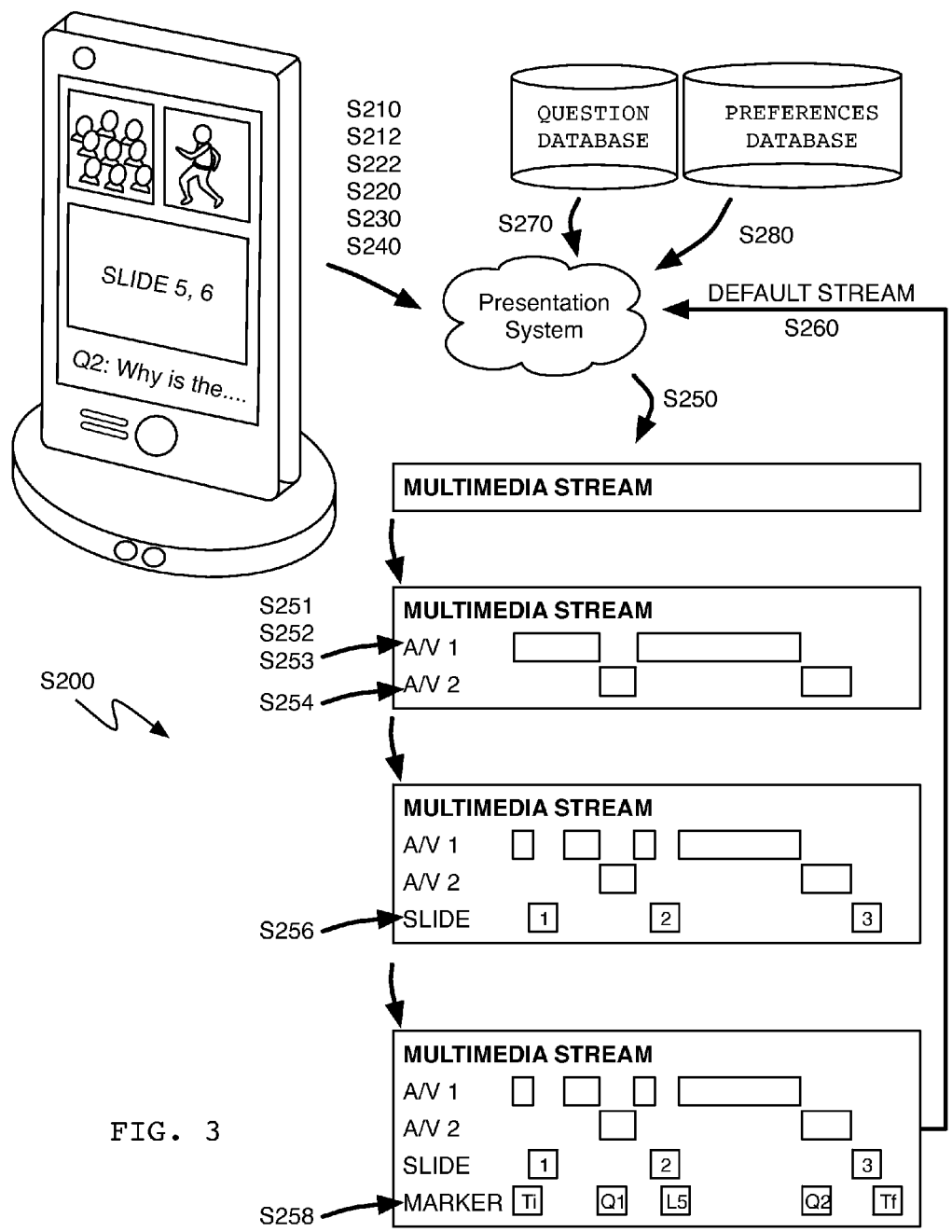
FIG. 3 is a flowchart representation of a second method.

As shown in FIG. 3, a second method S200 includes: receiving a video recorded through a camera within a mobile computing device during a period of time in Block S210; receiving an audio signal recorded through a remote device during the period of time in Block S230; receiving a first input selection and a second input selection entered into the remote device during the period of time in Block S240; receiving a position signal corresponding to a position of the remote device within a field of view of the camera during the period of time in Block S222; initiating a multimedia stream in Block S250; accessing a visual zoom preference and a visual cut preference of a user in Block S280; cropping a frame in the video according to the visual zoom preference and the position signal in Block S251; inserting the frame of the video into a visual component of the multimedia stream in Block S252; inserting digital slide content into the visual component of the multimedia stream based on the visual cut preference and the first input selection in Block S256; inserting a searchable marker into the multimedia stream based on the second input selection and a timestamp of the second input selection in Block S258; and inserting a portion of the audio signal into an audio component of the multimedia stream in Block S253.

The second method S200 can further include: receiving a second audio signal recorded through the mobile computing device during the period of time in Block S232; receiving a second video recorded through a second camera within the mobile computing device during the period of time in Block S212; and inserting a frame of the second video corresponding to a particular time into the visual component of the multimedia stream based on a noise amplitude in the second audio signal that exceeds a noise amplitude of the first signal by a threshold amplitude at the particular time in Block S254.

2.1 Applications

Generally, the second method S200 functions to generate a multimedia stream from various audio, video, object motion, user input, and other relevant data streams amassed during a presentation or similar event through the first method S100 (e.g., Blocks S110 through S142) described above, such as based on stored user preferences. The second method S200 can execute on a mobile computing device in real-time as audio and visual data are collected on the mobile computing device during a presentation, demonstration, etc., such as by combining and splicing together the various data into a single multimedia stream. Thus, the second method S200 can output a complete, processed, and searchable A/V file including disparate types of data from different sources without direct user interaction or manual input and do so with little delay following completion of the presentation and without additional processing equipment or software. The second method S200 can alternatively process the multimedia stream asynchronously (e.g., on a delay but during with recordation of the presentation or after recordation is complete), such as on a computer network or remote server.

The second method S200 can cooperate with a user interface within the native A/V (audio/visual) recording application to collect multimedia stream preferences, to receive manual adjustments to the multimedia stream, or to present the multimedia stream to the user (e.g., through A/V playback), etc. The second method S200 can alternatively execute on a computer network, such as a remote server, in communication with the mobile computing device, such as via an Internet connection, to download audio, video, and other related data from the mobile computing device. In this implementation, the second method S200 can cooperate with a user interface accessible through a web browser or other application executing on the mobile computing device to view and/or modify the multimedia stream.

2.3 Data Collection

Block S210 of the second method S200 recites receiving a first video recorded through a first camera within a mobile computing device over a first period of time. One variation of the second method S200 includes Block S212, which recites receiving a second video recorded through a second camera within the mobile computing device during the period of time. Block S230 of the second method S200 recites receiving a first audio signal recorded through a remote device and a second audio signal recorded through the mobile computing device. Block S240 of the second method S200 recites receiving a first input selection and a second input selection into the remote device during the first audio signal. Block S222 recites receiving a position signal corresponding to a position of the remote device within a field of view of the camera during the period of time.

One variation of the second method S200 includes Block S220, which recites receiving motion data of the remote device. Another variation of the method includes Block S270, which recites receiving a textual question from an audience member over a computer network and insetting text of the textual question over a frame of the segment of the first video in the multimedia stream.

The foregoing Blocks of the second method S200 function to collect or retrieve data collected in the first method S100 described above. Any of these Blocks of the second method S200 can cooperate with corresponding Blocks of the first method S100 to collect audio, video, event, and/or other data in real-time. Any of the Blocks of the second method S200 can alternatively collect audio, video, event, or other data asynchronously from a corresponding Block of the first method S100.

In one implementation, the foregoing Blocks of the second method S200 collect individual streams of sensor data, such as in the form of sequences of sensor sample data, and store these disparate streams with event, receipt time, and/or other tags, such as when the sensor data was received from a sensor, the remote device, or the base device. Subsequent Blocks of the second method S200 can then align these streams of sensor data based on the accompanying tags. Event tags can be received from a user (e.g., through the remote device in Block S140 or Block S142) in real-time with collection of accompanying data streams, or the second method S200 can generate event tags based on information extracted from the data streams, such as by implementing techniques described above and below.

2.4 Multimedia Stream

Blocks S250, S251, S252, S256, etc. of the second method S200 function to aggregate disparate audio, video, event, and other data streams into a single multimedia stream. The second method S200 can generate the multimedia stream that is static, that is, defines static combinations and splices of audio, video, and data. Alternatively, the second method S200 can generate the multimedia stream that is a default composite audio-video stream including default selections and arrangements of segments of the audio, video, and other data but which can be modified, such as directly through manual manipulation by a user (e.g., through the native A/V application) or indirectly through adjustment of processing preferences.

Block S250 of the second method S200 recites initiating the multimedia stream. Generally, Block S250 functions to prepare a digital file, folder, or project for aggregation and insertion of audio, video, event tags, and other data.

Block S280 of the second method S200 recites accessing a visual zoom preference and a visual cut preference of a user. Generally, Block S280 functions to collect audio and/or visual processing preferences of a user to apply to post-processing of the multimedia stream. For example, Block S280 can retrieve manually-entered or manually-selected preferences stored on a remote server or locally on the mobile computing device. Block S280 can additionally or alternatively predict or extrapolate user preferences over time from manual adjustments made to previous multimedia streams by the user, by other others, and/or by other users sharing one or more similarities (e.g., demographics) with the user. For example, Block S280 can access editing operation preferences pertaining to insertion of media, zooming in video frames, camera or video feed changes, audio feed changes, volume audio selection, video color adjustments, blocked or skipped content selection, and/or smoothing and artifact reduction, etc.

Block S280 can also access and/or set rules (e.g., "merging instructions") defining aggregation of the audio, video, and other data streams into audio, visual, and data (e.g., event tags) components of the multimedia stream. Blocks of the second method S200 can then apply these processing rules and/or preferences or rules and/or preferences specific to the current presentation, a presentation location or space, a time of day, a speaker, and audience, etc. to generate the multimedia stream. The set of rules can define how segments of various data feeds (e.g., first video, second audio signal) are aligned in time during the multimedia stream based on time stamp information (e.g., T, T+1, . . . , T+12) associated with and tagged in the data feeds, transitions between disparate audio, visual, and/or data streams, etc.

2.5 Videos/Visual Content

Block S252 of the second method S200 recites inserting the frame of the video into a visual component of the multimedia stream. Generally, Block S252 functions to select a section of the first video, which includes video of the remote device (and therefore the object or user), and to insert the section of the first video into the multimedia stream. Similarly, one variation of the second method S200 includes Block S254, which recites inserting a portion of the second video into the multimedia stream, such as based on a noise amplitude in the second audio signal that exceeds a noise amplitude of the first signal by a threshold amplitude at the particular time.

In one implementation, the second method S200 defaults to insertion of the first video into a visual component of the multimedia stream via Block S252. However, events during recordation of the presentation can trigger Block S254 to insert a section of the second video into the multimedia feed in place of the first video. For example, Block S254 can splice a portion of the second video into the multimedia stream—in place of the first video—based on a noise amplitude difference between the first audio signal and the second audio signal that exceeds a threshold amplitude difference. In this example, Block S252 can pair the first audio signal with the first video (e.g., audio from proximal the object or user and video of the object or user), and Block S254 can pair the second audio signal with the second video and identify events during the recording based on a comparison of the first and second audio signals. In this example, Block S254 can determine that an audience member is a point of interest and speaking during a period of time based on the amplitude of the second audio signal that exceeds the first audio signal and thus insert a portion of the second video corresponding to the period of time into the multimedia stream—rather than a portion of the first video for the same period of time—such that the audience member may be shown in the visual component of the multimedia stream. In this example, Block S254 can implement a static audio amplitude threshold, a predefined user threshold preference, etc. to extract an event from the first and/or second audio signals and thus trigger a switch from the first video to the second video accordingly.

Alternatively, Blocks S252 and S254 can insert video segments from the first and second videos into the multimedia stream based directly on user input selections received through the remote device during recordation. For example, the second method S200 can receive a user input selection event defining a switch from a first video selection to a second video selection at a toggle on the remote device and an associated timestamp for the event, and Block S254 can insert a portion of the second video following a frame corresponding to the timestamp into the multimedia stream by aligning the frame corresponding to the timestamp and a timer from the beginning of the multimedia stream.

In another example, Block S254 can implement motion data of the remote device to select a transition time for insertion of a portion of the second video into the multimedia stream. For example, the second method S200 can characterize motion data of the remote device with a state of the user, including correlating accelerations (e.g., within a particular range of frequencies or amplitudes) above a threshold with the user speaking or 'presenting' and correlating accelerations below the threshold with user silence, such as while an audience member delivers a question or comment orally. In this example, the second method S200 can implement machine learning to build a model of the particular user motion habits over time and/or implement a model of motion behavior of other users to characterize the particular user's motion during recordation. Thus, Block S254 can trigger a shift to insertion of frames of the second video into the multimedia stream when received acceleration data of the remote device falls below the threshold, and Block S252 can trigger a shift back to insertion of frames of the first video into the multimedia stream when received acceleration data of the remote device exceeds the threshold.

Blocks S252 and S254 can additionally or alternatively implement received motion data to dynamically crop frames in the first and second videos, respectively, such as based on a stored user zoom preference retrieved in Block S280. For example, Block S252 can implement virtual zooming for one or more frames in the first video in response to a decrease in amplitude of an acceleration signal within the motion data. In this example, the second method S200 can correlate low acceleration of the remote device with a period of low movement of the user (or object) and thus take the opportunity to virtually zoom in on the user's face. Blocks S252 and S254 can additionally or alternatively implement a position signal (i.e., output in Block S122) to track the remote device (and therefore the user) within frames of the first and second videos and then crop the frames to maintain the remote device within a particular area of each frame. Block 252 and S254 can therefore apply a tracked remote device position within frames of the first and second videos, respectively, motion data recorded through the remote device to edit frames of the videos in the visual component of the multimedia stream, and virtual zoom preferences of the user.

In one implementation, Block S252 digitally (i.e., virtually) implements a tilt effect in one or more frames of the first video by cropping corresponding frames, such as based on data from one or more sensors and with a preset aspect ratio of the cropped frame.

In another implementation, Block S252 determines a distance between the remote device and the base device and/or the mobile computing device for a particular frame, set of frames, timestamp, or period of time during the first video, etc. Block S252 can thus crop corresponding frames in the first video based on the determined distance such that the remote device, the user, and/or the object appear as a substantially consistent size or area within the first video (or segment of the first video within the multimedia stream). In this implementation, Block S252 can analyze IR signal data (described above), audio data (e.g., oral amplitude, time of flight), lighting effects in frames of the first video, a number of pixels in a frame of the first video corresponding to an object of known size, RF (e.g., Wi-Fi, Bluetooth) signal strength, etc. to estimate the distance between the remote device (or other object within the presentation space) and the mobile computing device and/or base device.

Block S252 can implement similar functionality with the position signal received in Block S222, and Block S254 can implement similar functionality to zoom into or crop one or more frames in portions of the second video in the multimedia stream.

Blocks S252 and S254 can insert non-overlapping (in time) portions of the first and second videos, respectfully, into the multimedia feed (i.e., only one frame from a single video is assigned to a particular time in the multimedia stream). Alternatively, Blocks S252 and S254 can cooperate to identify and insert a primary or 'default' video segment for a particular period of time and to identify and insert a secondary video segment that overlaps (in part or in full) the primary video segment. In this implementation, the user or other reviewer can thus manually select one of the two (or more) overlapping segments for final post-production or enable manual switching between the two (or more) overlapping segments during playback of the multimedia stream.

However, Blocks S252 and S252 can function and/or cooperate in any other way to insert portions of digital video content the visual component of the multimedia stream. The second method S200 can also receive a third, a fourth, and/or any other number of videos (e.g., from other mobile computing devices and/or base devices within the presentation venue) and insert and/or splice segments and/or portions of the other videos into the multimedia stream, such as by implementing any of the foregoing techniques or methods.

Block S256 of the second method S200 recites, inserting digital slide content into the visual component of the multimedia stream based on the visual cut preference and the first input selection. Generally, Block S256 functions to insert a slide of a slide deck pertaining to the recorded presentation in the multimedia stream as a static or dynamic (e.g., animated) image of regenerated content. As described above, the first method S100 can download a slide deck and index through slides within the slide deck (e.g., by displayed various slides or corresponding noted on the display) based on user input selections; the first method S100 can also generate event tags specifying slide changes, times of slide changes, and/or specific slide content. Block S256 can thus implement slide-related event tags to trigger inserting of corresponding slides into the multimedia feed.

In one implementation, Block S256 inserts a particular static slide in the multimedia field beginning at an elapsed multimedia stream time corresponding to a timestamp of the event tag for the particular static slide. In this implementation, Block S256 can download the slide independently of the complete slide deck via a URL stored in the event tag, by extracting content of the slide from the event tag directly, or by downloading the complete slide deck and selecting the particular slide based on a slide identified (e.g., a slide deck filename and a slide number) extracted from the event tag. Block S256 can then set a duration of display of the particular slide in the multimedia stream based on a preset slide duration, such as five seconds or based on a stored user preference collected in Block S280. Block S256 can alternatively extract a content density from the particular slide, such as based on a number of words, alphabetical characters, mathematical and/or numerical characters, etc. and calculate a duration of display of the particular slide accordingly and based on a stored visual cut preference of the user. Block S256 can yet alternatively set the duration of display of the particular slide based on an elapsed time between the corresponding slide event tag and a preceding slide event tag and/or a subsequent slide event tag. Block S256 can also cycle the particular slide into the multimedia stream (e.g., for five seconds out of every fifteen seconds while the particular slide is still current), such as based on content density of the slide, a number of questions submitted by audience members while the particular slide is projected during the presentation, and/or a visual cut preference of the user.

Block S256 can insert the particular slide as a static image that fills a complete visual area within the visual component of the multimedia stream. Additionally or alternatively, Block S256 can inset the particular slide as a static image over a subarea of the assigned multimedia stream, such as a static image inset near a lower right corner of a sequence of frames of the first and/or second videos in the multimedia stream based on a corresponding user preference. Block S256 can also insert updated content for the particular slide into the multimedia stream, such as animations based on subsequent event tags indicating input region selections on the remote device while the particular slide is still current in the projected slide deck. Block S256 can subsequently insert a subsequent slide into the multimedia stream based on a subsequent corresponding slide event tag. Block S256 can similarly insert preceding slides into the multimedia stream based on slide event tag specifying a <slide reverse> or <previous slide> command.

Block S256 can also insert—into the visual component of the multimedia stream—a sketch or note created by the user through a touch display within the mobile computing device during the presentation.

However, Block 256 can function in any other way to insert one or more static or dynamic slides or visual content in any other format and according to any other timing schema into the multimedia stream. Like Blocks S252 and S254, Block S256 can also identity and insert a particular slide as a default, secondary, tertiary, or other-level visual segment into the multimedia stream for manual confirmation by the user or real-time selection during playback.

One variation of the second method S200 includes Block S270, which recites receiving a textual question from an audience member over a computer network and insetting text of the textual question over a frame of the segment of the first video in the multimedia stream. Generally, Block S270 functions to collect a textual question (or components or elements of a question) submitted by a local or remote audience member during the presentation. For example, Block S270 can download a textual question from an audience member through a computer network during the presentation or implement any other technique or method, such as described above, to access or collect one or more questions from one or more audience members. Block S270 can also collect and/or store a timestamp associated with an audience question, such as corresponding to when the question was submitted or when the user responded to the question (relative to the beginning of, the end of, or another time marker within the multimedia stream).

Block S270 can subsequently implement the timestamp associated with a question to insert text of the question into the multimedia stream. For example, Block S270 can inset complete alphanumeric text of the question over frames of a current video (e.g., the first video or the second video) in the multimedia stream and following a time matching the timestamp of the question. In this example, Block S270 can insert text of the question over frames of the current video for any suitable period of time, such as a preset period of ten seconds or a dynamic period of time, such as based on the alphanumeric length of the question or based on a length of time that the user spends addressing the question. Alternatively, rather than setting text of the question over frames of video within the multimedia stream, Block S270 can generate a new blank (e.g., white) frame, add text of the question to the blank frame, and insert the frame (and a number of duplicates of the frame corresponding to a prescribed display time of the question) into the multimedia stream at the corresponding time. However, Block S270 can function in any other way to collect and insert details of an audience question into the multimedia stream.

2.5 Audio Signals/Audible Content

Blocks S253 and S255 of the second method S200 can implement techniques similar to those described above to selectively insert audio content into the multimedia stream. As described above, Block S252 can associate the first audio signal with the first video, and Block S254 can associate the second audio signal with the second video. Block S253 can thus insert portions of the first audio signal into an audio component of the multimedia stream when corresponding (in time) portions of the first video are inserted in the multimedia stream, and Block S255 can insert portions of the second audio signal into the multimedia stream when corresponding (in time) portions of the second video are inserted in the multimedia stream. When a slide is displayed in the multimedia stream (e.g., as a primary visual content), Blocks S253 and S255 can maintain a current audio signal in the multimedia stream until the slide is removed (in time) from the multimedia stream or until another event tag triggers a switch to an alternative audio signal. Blocks S253 and S255 can also switch audio signals in the midst of a time period corresponding to a slide inserted into the multimedia stream, such as by implementing any of the foregoing techniques or methods to identity a content change trigger and thus respond accordingly.

Blocks S253 and S255 can also cooperate to combine or 'mix' the first and second audio signals. For example, Block S253 can insert the first audio signal into a left channel of an audio component of the multimedia stream for a specified period of time, and Block S255 can insert the second audio signal into a right channel of an audio component of the multimedia stream for the same specified period of time. In a similar example, Block S253 can insert the first audio signal into a left channel and a right channel of an audio component of the multimedia stream for a specified period of time, and Block S253 can mix a portion of the second audio signal into the left channel for a portion of the specified period of time. In this example, Blocks S253 and S255 can also cooperate to dynamically adjust volume levels and/or equalizer settings of portions of the first and second audio signals inserted into the multimedia stream.

However, Blocks 253 and S255 can function in any other way to insert audio content into the multimedia stream. As described above, Blocks S253 and S255 can also identify and insert a particular audio signal as a default, secondary, tertiary, or other-level audio segment into the multimedia stream for manual confirmation by the user or real-time selection during playback.

2.6 Searchable Markers

Block S258 recites inserting a searchable marker into the multimedia stream based on the second input selection and a timestamp of the second input selection. Generally, Block S258 functions to insert searchable markers into the multimedia stream, such as based on event tags generated during recordation of the presentation and/or based on event tags generated asynchronously from data recorded during the presentation, such that the user or other reviewer can locate an event in an audio-visual multimedia stream through a text-based search.

In one implementation, Block S258 correlates an input region selection (e.g., the second input selection described above) with a marker type within a set of available marker types and then inserts the searchable marker into the multimedia stream at a time corresponding to an elapsed time after a start time of the multimedia stream and the timestamp of the second input selection. In this implementation, Block S258 can select the marker type from the set of marker types that includes any of a reminder tag (e.g., to edit this section of the multimedia stream), a review tag (to clarify content in this section), a question tag (to add additional textual content in response to a question in this section), a behavior tag (e.g., to note a behavior of an audience member in this section), an error tag (e.g., to note an error in the system or in presented content in this section), a feeling tag (e.g., to note a change in comfort level of the user during this section), etc. Block S258 can thus insert a marker of any of the foregoing marker types into an event component of the multimedia stream based on timestamps of the markers during the presentation.

In another implementation, Block S258 accesses a library of acceleration profiles or prescribed thresholds corresponding to particular motion-related events (e.g., throwing a ball, jumping, a control gesture, etc.) to correlate motion data received in Block S220 with a particular action or gesture. Block S258 can thus insert a marker corresponding to an identified action or gesture, including a description of the action or gesture, into the multimedia stream based on the timestamp. For example, Block S258 can identify a particular type of gesture, such as waving of the user's right hand, and characterize the gesture as a particular type of command, such as to index a slide forward. Block S258 can generate and insert a marker into the multimedia stream accordingly and/or pass the identified command type to a corresponding Block of the second method S200, such as Block S256 for the gesture associated with a <slide forward> command.

Block S258 can additionally or alternatively extract events from audio data and/or visual data generated during the recording. In one example, Block S258 identifies laughter in the second audio signal during a period of time, generates a 'start' laughter marker, generates a 'stop' laughter marker, inserts the 'start' laughter marker at a time in the multimedia stream corresponding to the beginning of the period of time, and inserts the 'stop' laughter marker at a time in the multimedia stream corresponding to the end of the period of time. In this example, Block S258 can similarly identify laughter amongst an audience and generate corresponding laughter markers by detecting and analyzing faces in the second video (output by the second camera within the mobile computing device and facing the audience). In another example, Block S258 identifies the 'crack' of a baseball on a baseball bat in the first audio signal at a particular time, generates a 'hit' marker, and inserts the 'hit' marker at a time in the multimedia stream corresponding to the particular time. In this example, Block S258 can similarly identify contact between a baseball and a baseball bat and generate a corresponding 'hit' marker by analyzing the first video (output by the first camera within the mobile computing device and facing a hitter (e.g., the user)).

In another example, Block S258 can generate a marker indicating a change in light level within the first and/or second video and insert the light level tag into the multimedia stream accordingly. In this example, Block S258 can extrapolate further information from a change in light level, such as by determining that the presentation is about to begin when the light level decreases significantly over a short period of time and thus generating 'and inserting beginning presentation' tag into the multimedia stream accordingly. In yet another example, Block S258 cooperates with Block S270 to generate a question marker including all of, a key phrase of, or a summary of a question submitted by an audience member. In this example, Block S258 can insert the question marker into the multimedia stream at a time corresponding to when the question was submitted (or a time corresponding to when the user answered the question, etc.). In another example, Block S258 can retrieve user vital information from a wearable device worn by the user (e.g., a heart rate monitor, a pulse oximeter, a galvanic skin response sensor, or other biosensor), generate a corresponding user biomarker (e.g., 'heart rate rose above 100 bpm'), and insert the biomarker into the multimedia stream accordingly. In this example, Block S258 can extrapolate further information from the biosensor, such as by correlating a change in galvanic skin response of the user with a change in stress level during the presentation and thus generate and insert a marker including this information into the multimedia stream. In this example, Block S258 can yet further correlate the change in stress level during the presentation with an argument or productive conversation during the presentation and generate and insert a marker including this information into the multimedia stream.

Block S258 can also affirm or corroborate an event extracted from one sensor stream by comparing the event to events extracted from others sensor streams at approximately the same time. Block S258 can also apply a preference and/or event tag history of the user, as accessed in Block S280, to generate an event tag and to apply the event tag to the multimedia stream as a searchable marker. However, Block S258 can extrapolate any other kind or type of marker from any suitable sensor stream.

Block S258 can generate and/or insert markers that include searchable textual references into the multimedia stream such that the user or other reviewer can navigate through the multimedia stream filter sections of the multimedia stream, identify sections of interest within the multimedia stream, etc. through text-based searches. In one example, Block S258 inserts markers that include textual marker type descriptions and associated timestamps into the multimedia stream. In another example, Block S258 inserts slide change markers that include textual content extracted from corresponding slides, such as slide synopses or paraphrased slide content. In yet another example, Block S258 inserts remote device (or user) position markers including a textual indicator of a position or a change in position of the remote device at a corresponding time. However, Block S258 can insert a marker of any other type and including any other textual content into the multimedia stream. Block S258 can also prioritize markers that occur substantially the same time or within a certain period of time.

Block S258 can therefore augment the audio and visual components of the multimedia stream with time-related event tags (i.e., markers) such that the multimedia stream is searchable. For example, Block S258 can enable the user to search for a portion of the multimedia stream that corresponds to the sound of a bat hitting a ball, and the native A/V application described above can playback portions of the multimedia stream that include similar markers or event tags. However, Block S258 can insert searchable markers of any other type or form into the multimedia stream in any other way and enable text-based searching of the audio-visual multimedia stream according to any other schema.

As shown in FIG. 3, one variation of the second method S200 includes Block S260, which recites uploading the default composite audio-video stream, the first video, the second video, the first audio signal, the second audio signal, the first input selection, and the second input to a computer network. Generally, Block S260 functions to output a default multimedia stream including cuts, splices, and combinations of disparate audio and visual signals with corresponding searchable markers as well as all or portions of the original data streams. For example, Block S260 can output the default multimedia stream to the native A/V application such that user can review, edit, and/or share the default multimedia stream.

In one implementation, the second method S200 is applied on a computer network (e.g., a remote server) connected to the mobile computing device (e.g., via an Internet connection). In this implementation, Block S260 can transmit the default multimedia stream back to the user's mobile computing device for review of the multimedia stream. Block S260 can thus collect user selections, confirmations, edits, and/or modifications to the default multimedia stream from the mobile computing device and pass these user inputs back to the computer network, wherein the user inputs are applied to the default multimedia stream to output a finalized multimedia stream. For example, Block S260 can modify durations of segments of the first video, the second video, the first audio signal, and the second audio signal within the default multimedia (i.e., composite audio-video) stream according to the user inputs. However, Block S260 can function in any other way to output the default composite audio-video stream and can respond to user inputs pertaining to finalization of the composite audio-video stream in any other suitable way.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for monitoring an object during a presentation, comprising:
   initiating capture of a video with a camera defining a field of view, the camera arranged on a first side of a mobile computing device supported on a base device;
   generating a position signal defining a position of the remote device relative to the camera;
   in response to wirelessly receiving a first input selection from the remote device, indexing through digital slide content rendered on a display arranged on the first side of the mobile computing device;
   in response wirelessly receiving sensor data from a remote device coupled to the object, generating an event tag comprising a timestamp; and
   generating a multimedia stream comprising the video, the position signal data, digital slide content, the first input selection, and the event tag;
   wherein indexing through the digital slide content comprises indexing through slides of a digital slide deck, wirelessly broadcasting a slide change command in response to receiving the first input selection from the remote device and storing the first input selection as a slide number of a digital slide deck and associated timestamp relative to the video.

2. The method of claim 1, wherein generating the position signal comprises outputting the position signal to an actuator within the base device to adjust an orientation of the mobile computing device to maintain the remote object within the field of view of the camera throughout the video.

3. The method of claim 1, wherein generating the multimedia stream comprises initiating the multimedia stream in response to initiation of the video;

accessing a production preference of a user;

inserting a portion of the video into the multimedia stream according to the production preference and the position signal;

inserting digital slide content into the multimedia stream for a period of time after the portion of the video based on the production preference and the first input selection; and inserting a searchable marker into the multimedia stream based on the event tag.

4. The method of claim 3, further comprising downloading a textual question from an audience member through a computer network during the presentation, rendering the textual question on the display, and insetting text of the textual question over a frame of the video in the multimedia stream.

5. The method of claim 4, wherein insetting the textual question over the frame of the video in the multimedia stream comprises insetting text of the textual question over a frame corresponding to the timestamp.

6. The method of claim 1, further comprising wirelessly receiving an audio signal from the remote device, wherein generating the multimedia stream comprises generating a default composite audio-video stream comprising segments of the video, the audio signal, and the digital slide content substantially in real-time during the presentation.

7. The method of claim 6, further comprising uploading the default composite audio-video stream, the video, the audio signal, and the digital slide content to a computer network and modifying durations of segments of the video and durations of digital slide content within the default composite audio-video stream according to a user input.

8. The method of claim 1, further comprising initiating capture of a second video with a second camera arranged on a second side of a mobile computing device opposite the first side and recording a second audio signal through the mobile computing device, wherein generating the multimedia stream comprises generating the multimedia stream that further comprises the second video and the second audio signal.

9. A method for producing multimedia video presentations comprising:

receiving a video recorded through a camera within a mobile computing device during a period of time;

receiving an input selection entered into the remote device during the period of time;

receiving sensor data from the remote device during the period of time;

initiating a multimedia stream;

accessing a production preference of a user;

inserting a frame of the video into a visual component of the multimedia stream according to the production preference and the sensor data;

inserting digital slide content into the visual component of the multimedia stream based on the production preference, the input selection, and the sensor data;

generating an event tag into the multimedia stream based on the sensor data; and inserting an event tag into the multimedia stream based on the sensor data and a corresponding timestamp;

wherein receiving sensor data from the remote device comprises receiving motion data of the remote device during the period of time, wherein inserting the frame of the video into the multimedia stream comprises cropping the frame in the video further based on the motion data of the remote device.

10. The method of claim 9, wherein cropping the frame in the video comprises zooming into a portion of the frame in response to a decrease in amplitude of an acceleration signal within the motion data.

11. The method of claim 9, wherein inserting digital slide content into the visual component of the multimedia stream comprises indexing to a subsequent slide in a slide deck and inserting the subsequent slide into the visual component of the multimedia stream for a period of time according to the production preference.

12. The method of claim 9, further comprising receiving an audio signal recorded through the remote device during the period of time, receiving a second video recorded through a second camera within the mobile computing device during the period of time, inserting a frame of the second video corresponding to a particular time into the visual component of the multimedia stream based on the sensor data, and inserting a portion of the audio signal into an audio component of the multimedia stream.

13. The method of claim 12, further comprising receiving a second audio signal recorded through the mobile computing device during the period of time and inserting a portion of the second audio signal into the audio component of the multimedia stream based on a noise amplitude of the second audio signal that exceeds a noise amplitude of the first signal by a threshold amplitude.

14. The method of claim 12, further comprising outputting the multimedia stream as a default composite audio-video stream within a multimedia file, the multimedia file comprising the video, the audio signal, the first input selection, the second input selection, and the position signal.

15. The method of claim 14, further comprising uploading the multimedia stream to a computer network and modifying durations of segments of the video and digital slide content within the default composite audio-video stream according to the production preferences.

16. The method of claim 9, wherein inserting the event tag into the multimedia stream comprises receiving a second input selection from the remote device, correlating the second input selection with a marker type within a set of available marker types, and inserting the marker of the marker type into the multimedia stream at a time corresponding to an elapsed time after a start time of the multimedia stream and a timestamp of the second input selection.

17. The method of claim 9, further comprising receiving a textual question from an audience member over a computer network and insetting text of the textual question over a frame of the video in the multimedia stream.

* * * * *

UNITED STATES PATENT AND TRADEMARK OFFICE
CERTIFICATE OF CORRECTION

| | |
|---|---|
| PATENT NO. | : 9,699,431 B2 |
| APPLICATION NO. | : 13/971767 |
| DATED | : July 4, 2017 |
| INVENTOR(S) | : Brian Whitney Lamb, Vladimir Tetelbaum and Eran Steinberg |

It is certified that error appears in the above-identified patent and that said Letters Patent is hereby corrected as shown below:

In the Claims

In Column 24, Line 48, "in response wirelessly receiving sensor data" should read "in response to wirelessly receiving sensor data"

Signed and Sealed this
Eighth Day of August, 2017

Joseph Matal
*Performing the Functions and Duties of the*
*Under Secretary of Commerce for Intellectual Property and*
*Director of the United States Patent and Trademark Office*